United States Patent
Sawada et al.

(10) Patent No.: US 7,624,672 B2
(45) Date of Patent: Dec. 1, 2009

(54) PISTON APPARATUS

(75) Inventors: Daisaku Sawada, Gotenba (JP); Shinichi Mitani, Susono (JP); Hiroshi Yaguchi, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 394 days.

(21) Appl. No.: 11/664,935

(22) PCT Filed: Dec. 28, 2005

(86) PCT No.: PCT/JP2005/024086

§ 371 (c)(1),
(2), (4) Date: Apr. 9, 2007

(87) PCT Pub. No.: WO2006/073114

PCT Pub. Date: Jul. 13, 2006

(65) Prior Publication Data

US 2009/0008191 A1 Jan. 8, 2009

(30) Foreign Application Priority Data

Jan. 7, 2005 (JP) ............................. 2005-002871

(51) Int. Cl.
*F01B 31/00* (2006.01)
(52) U.S. Cl. ...................... 92/157; 92/DIG. 2
(58) Field of Classification Search .................. 92/157, 92/DIG. 2
See application file for complete search history.

(56) References Cited

U.S. PATENT DOCUMENTS 5,039,285 A * 8/1991 Lindstrom ................... 92/157
6,016,738 A * 1/2000 Elferink et al. .......... 92/DIG. 2

FOREIGN PATENT DOCUMENTS

| JP | A-64-087853 | 3/1989 |
| JP | A 06-272708 | 9/1994 |
| JP | A 07-224807 | 8/1995 |
| JP | A-2000-046431 | 2/2000 |
| JP | A 2002-323008 | 11/2002 |
| JP | A 2002-349347 | 12/2002 |

* cited by examiner

*Primary Examiner*—F. Daniel Lopez
(74) *Attorney, Agent, or Firm*—Oliff & Berridge, PLC

(57) ABSTRACT

In order to decrease internal friction of a heat engine that converts a reciprocating motion of a piston into a rotational motion, a piston apparatus (1) forms an air bearing between a crankshaft (30) and a bearing unit (9B) provided in a crankcase (9) and between an eccentric portion (30c) of the crankshaft (30) and a large end portion (201) of a connecting rod (20) by feeding a gas therebetween from a crank-side hollow portion (31) of the crankshaft (30). The piston apparatus 1 also forms an air bearing between a piston pin (40) and a small end portion (202) of the connecting rod (20) by feeding a gas therebetween from a piston pin-side hollow portion (43) in the piston pin (40).

7 Claims, 12 Drawing Sheets

PISTON APPARATUS

TECHNICAL FIELD

The present invention relates to a piston apparatus in which a piston reciprocates in a cylinder.

BACKGROUND ART

Recently a Stirling engine having excellent theoretical thermal efficiency receives attention to recover exhaust heat of an internal combustion engine mounted on a vehicle such as a passenger car, a bus, and a track or plant exhaust heat. There is known a technique disclosed in Patent Document 1 as a piston apparatus applicable to an external combustion engine including the Stirling engine.

A piston of a heat engine disclosed in Patent Document 1 is one which is applied to a type of Stirling engine in which a displacer is used. The displacer is driven by action of a working medium which repeats compression and expansion in a working space in association with reciprocating motion of the piston in a cylinder. The piston of the heat engine includes a compressing chamber, a check valve, and an orifice. The compressing chamber is formed inside the piston, and temporarily accumulates the working medium compressed in the working space. The check valve prevents the working medium in the compressing chamber from flowing back into the working space. The orifice ejects the working medium in the compressing chamber to a clearance portion between the piston and the cylinder.

Patent Document 1: Japanese Patent Application Laid-Open (JP-A) No. 2000-46431

DISCLOSURE OF INVENTION

Problem to be Solved by the Invention

In the case of a heat source having a low temperature, unless internal friction of the heat engine is decreased, power taken from the heat source becomes extremely small or the power can not be taken. In the piston included in the heat engine disclosed in Patent Document 1, since the internal friction is decreased, the working medium can be ejected to the clearance portion between the piston and the cylinder. At this point, in the heat engine disclosed in Patent Document 1, it is not necessary to convert the reciprocating motion of the piston into rotational motion. However, in the heat engine which converts the reciprocating motion of the piston into the rotational motion, since friction is also generated in a joining portion of a crankshaft and a connecting rod and a joining portion of the connecting rod and a piston pin, unlike the heat engine disclosed in Patent Document 1, it is insufficient to decrease the friction between the piston and the cylinder.

It is an object of the present invention to provide a piston apparatus which can decrease the internal friction in the heat engine for converting the reciprocating motion of the piston into the rotational motion.

Means for Solving Problem

To achieve the object, a piston apparatus according to the present invention includes a piston pin that includes a pin-side air inlet and a gas inflow port, gas being caused to flow out through the pin-side air inlet from a pin-side hollow portion provided in the piston pin, the gas being taken in the pin-side hollow portion through the gas inflow port, the piston pin being attached to a piston which performs reciprocating motion in a cylinder; a crankshaft that includes a crank-side air inlet and a gas outflow port, the gas being caused to flow out through the crank-side air inlet from a crank-side hollow portion provided in the crankshaft, the gas in the crank-side hollow portion being fed in the pin-side hollow portion through the gas outflow port; a connecting rod that has a first end portion and a second end portion, the first end portion being joined to an eccentric portion of the crankshaft, the second end portion being joined to the piston pin, the connecting rod feeding the gas in the crank-side hollow portion to the pin-side hollow portion through a gas passage formed in the connecting rod; a first pressure release unit that is provided between the gas outflow port and the crank-side air inlet; and a second pressure release unit that is provided between the gas inflow port and the pin-side air inlet.

In the piston apparatus according to another aspect of the present invention, labyrinth seals are provided between the first pressure release unit and the gas outflow port and between the second pressure release unit and the gas inflow port.

A piston apparatus according to still another aspect of the present invention includes a piston pin that includes a pin-side air inlet and a gas inflow port, gas being caused to flow out through the pin-side air inlet from a pin-side hollow portion provided in the piston pin, the gas being taken in the pin-side hollow portion through the gas inflow port, the piston pin being attached to a piston which performs reciprocating motion in a cylinder; a crankshaft that includes a crank-side air inlet and a gas outflow port, the gas being caused to flow out through the crank-side air inlet from a crank-side hollow portion provided in the crankshaft, the gas in the crank-side hollow portion being fed in the pin-side hollow portion through the gas outflow port; and a connecting rod that has a first end portion and a second end portion, the first end portion being joined to an eccentric portion of the crankshaft, the second end portion being joined to the piston pin, the connecting rod feeding the gas in the crank-side hollow portion to the pin-side hollow portion through a gas passage formed in the connecting rod, wherein the gas outflow port included in the crankshaft is provided while avoiding a portion where the eccentric portion becomes the most eccentric.

A piston apparatus according to still another aspect of the present invention includes a piston pin that includes a pin-side air inlet and a gas inflow port, gas being caused to flow out through the pin-side air inlet from a pin-side hollow portion provided in the piston pin, the gas being taken in the pin-side hollow portion through the gas inflow port, the piston pin being attached to a piston which performs reciprocating motion in a cylinder; a crankshaft that includes a crank-side air inlet and a gas outflow port, the gas being caused to flow out through the crank-side air inlet from a crank-side hollow portion provided in the crankshaft, the gas in the crank-side hollow portion being fed in the pin-side hollow portion through the gas outflow port; and a connecting rod that has a first end portion and a second end portion, the first end portion being joined to an eccentric portion of the crankshaft, the second end portion being joined to the piston pin, the connecting rod feeding the gas in the crank-side hollow portion to the pin-side hollow portion through a gas passage formed in the connecting rod, wherein grooves are formed in inner peripheral surfaces of the first end portion and the second end portion or outer peripheral surfaces of the piston pin and the eccentric portion, and the gas outflow port of the crankshaft and the gas inflow port of the piston pin are communicated with the grooves while the piston is reciprocated one time.

In the piston apparatus according to still another aspect of the present invention, the groove is formed while avoiding a portion which includes the most-eccentric portion of the eccentric portion, the portion facing a rotational axis side of the crankshaft with respect to the most-eccentric portion of the eccentric portion.

A piston apparatus according to still another aspect of the present invention includes a piston pin that includes a pin-side air inlet and a gas inflow port, gas being caused to flow out through the pin-side air inlet from a pin-side hollow portion provided in the piston pin, the gas being taken in the pin-side hollow portion through the gas inflow port, the piston pin being attached to a piston which performs reciprocating motion in a cylinder; a crankshaft that includes a crank-side air inlet and a gas outflow port, the gas being caused to flow out through the crank-side air inlet from a crank-side hollow portion provided in the crankshaft, the gas in the crank-side hollow portion being fed in the pin-side hollow portion through the gas outflow port; and a connecting rod that has a first end portion and a second end portion, the first end portion being joined to an eccentric portion of the crankshaft, the second end portion being joined to the piston pin, the connecting rod feeding the gas in the crank-side hollow portion to the pin-side hollow portion through a gas passage formed in the connecting rod, wherein a cross-sectional shape perpendicular to a rotational axis of the crankshaft in a rotating shaft portion of the crankshaft is included in a cross-sectional shape perpendicular to the rotational axis of the crankshaft in the eccentric portion.

A piston apparatus according to still another aspect of the present invention includes a piston pin that includes a pin-side air inlet and a gas inflow port, gas being caused to flow out through the pin-side air inlet from a pin-side hollow portion provided in the piston pin, the gas being taken in the pin-side hollow portion through the gas inflow port, the piston pin being attached to a piston which performs reciprocating motion in a cylinder; a crankshaft that includes a crank-side air inlet and a gas outflow port, the gas being caused to flow out through the crank-side air inlet from a crank-side hollow portion provided in the crankshaft, the gas in the crank-side hollow portion being fed in the pin-side hollow portion through the gas outflow port; and a connecting rod that has a first end portion and a second end portion, the first end portion being joined to an eccentric portion of the crankshaft, the second end portion being joined to the piston pin, the connecting rod feeding the gas in the crank-side hollow portion to the pin-side hollow portion through a gas passage formed in the connecting rod, wherein a piston-side air inlet is provided in a side peripheral portion of the piston, the gas being caused to flow out between the piston and the cylinder from a piston-side hollow portion provided in the piston, and the pin-side hollow portion formed in the piston pin is communicated with the piston-side hollow portion.

EFFECT OF THE INVENTION

According to the present invention, the internal friction can be decreased in the heat engine which converts the reciprocating motion of the piston into the rotational motion.

EXPLANATIONS OF LETTERS OR NUMERALS

Figure 1:
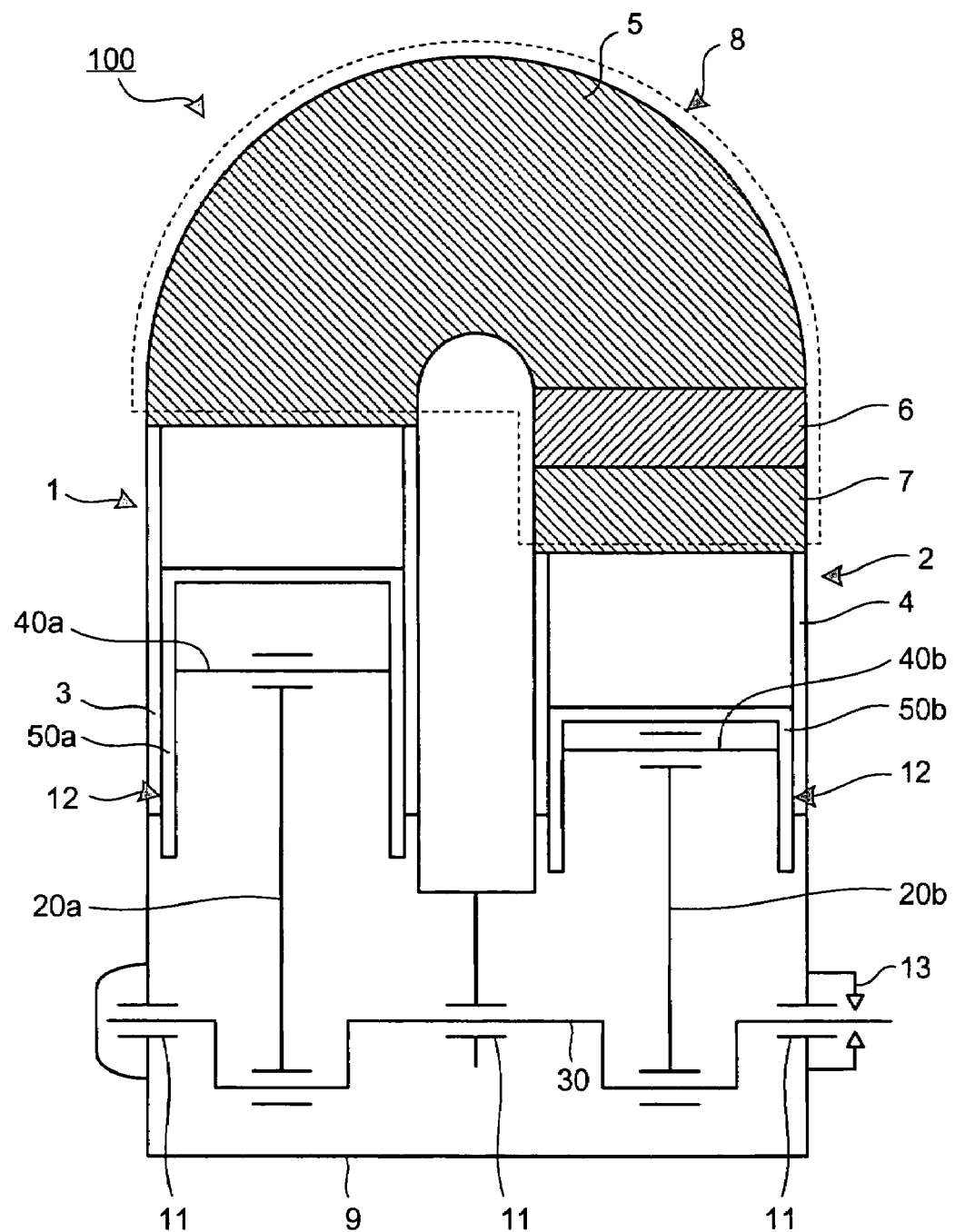
FIG. 1 is a sectional view showing a Stirling engine according to an embodiment.

Piston apparatus (high-temperature-side piston apparatus)
3 Cylinder (high-temperature-side cylinder)
9 Crankcase
10 Pump
14 Bearing-unit communication hole
15 Bearing-side pressure release groove
16 Gas supply groove
17 Pressure release hole
20, 20A, 20B, 20C, 20D Connecting rod
20$_1$ Large end portion (first end portion)
20$_2$ Small end portion (second end portion)
20s Connecting rod shaft portion
21 Gas passage
22 Groove
23 Second pressure release unit
23g Second pressure release groove
23h Second communication hole
24 Labyrinth seal
25 Groove
26 First pressure release unit
26g First pressure release groove
26h First communication hole
27 Labyrinth seal
30, 30A Crankshaft
30c Eccentric portion
30s Rotating shaft portion
30E Most-eccentric portion
30EO Most-eccentric portion facing portion
31 Crank-side hollow portion
33 Gas outflow port
34 Crank-side air inlet
35 Crank-side air inlet
37 Crank-side air inlet
38 Groove 40, 40A, 40B, 40C Piston pin
40o Piston pin opening portion
40TB Crankshaft-side top portion
40TP Piston top surface-side top portion
40s Side-peripheral portion
41 Gas inflow port
42 Pin-side air inlet
43 Pin-side hollow portion
50 Piston
100 Stirling engine

BEST MODE(S) FOR CARRYING OUT THE INVENTION

Exemplary embodiments of the present invention will be described in detail below with reference to the drawings. The invention is not limited to the best mode for carrying out the invention. A component in the best mode for carrying out the invention shall include a component which those skilled in the art can easily envision or a component which is substantially similar to the component in the best mode for carrying out the invention.

In the following description, the Stirling engine which is the heat engine is cited as an example of the apparatus including the piston apparatus. However, the apparatus to which the piston apparatus according to the invention can be applied is not limited to the Stirling engine. An example in which the exhaust heat of the internal combustion engine mounted on the vehicle is recovered using the Stirling engine is described below. However, the exhaust heat recovering target is not limited to the internal combustion engine. For example, the invention can also be applied to the exhaust heat recovery in a factory, a plant, and an electric power plant.

EMBODIMENT

A piston apparatus according to an embodiment includes a piston pin, a crankshaft, and a connecting bar. The piston pin includes a gas inflow port which takes gas into a pin-side hollow portion provided inside. The crankshaft includes a gas outflow port through which the gas is fed into the pin-side hollow portion from a crank-side hollow portion provided inside. The connecting bar supplies the gas on the crank-side hollow portion to the pin-side hollow portion through a gas passage formed inside. In the piston apparatus according to the embodiment, a first pressure release unit is provided between the gas outflow port of the crankshaft and a crank-side air inlet which causes the gas in the crank-side hollow portion to flow out and a second pressure release unit is provided between the gas inflow port of the piston pin and a pin-side air inlet which cause the gas in the pin-side hollow portion to flow out.

Figure 2:
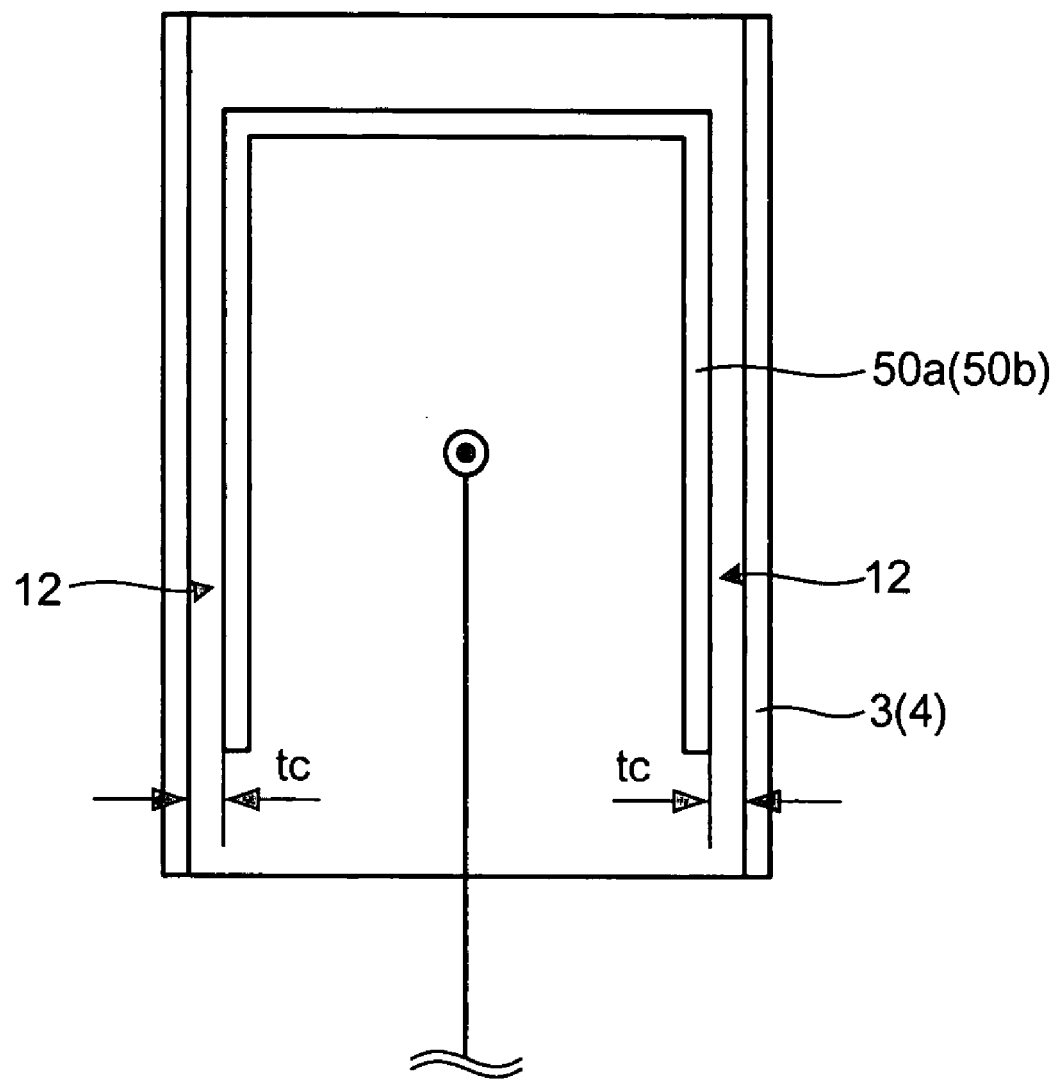
FIG. 2 is a sectional view showing an air bearing between a piston and a cylinder of the Stirling engine according to the embodiment.

FIG. 1 is a sectional view showing a Stirling engine according to the embodiment. FIG. 2 is a sectional view showing an air bearing between the piston and the cylinder of the Stirling engine according to the embodiment. A Sterling engine 100 which is the heat engine including the piston apparatus according to the embodiment is a so-called a-type Stirling engine, and includes a high-temperature-side piston apparatus 1 and a low-temperature-side piston apparatus 2. The high-temperature-side piston apparatus 1 includes a high-temperature-side cylinder 3, a high-temperature-side piston 50a, and a high-temperature-side connecting rod 20a. The high-temperature-side piston 50a performs the reciprocating motion while accommodated in the high-temperature-side cylinder 3. The high-temperature-side connecting rod 20a transmits the reciprocating motion of the high-temperature-side piston 50a to a crankshaft 30. The low-temperature-side piston apparatus 2 includes a low-temperature-side cylinder 4, a low-temperature-side piston 50b, and a low-temperature-side connecting rod 20b. The low-temperature-side piston 50b performs the reciprocating motion while accommodated in the low-temperature-side cylinder 4. The low-temperature-side connecting rod 20b transmits the reciprocating motion of the low-temperature-side piston 50b to the crankshaft 30. In this case, the low-temperature-side piston 50b has a phase difference of about 90° in terms of a crank angle with respect to the high-temperature-side piston 50a.

The high-temperature-side cylinder 3 and the low-temperature-side cylinder 4 are connected by a heat exchanger 8 including a heater 5, a regenerator 6, and a cooler 7. One end of the heater 5 is connected to the high-temperature-side cylinder 3, and the other end thereof is connected to the regenerator 6. One end of the regenerator 6 is connected to the heater 5 and the other end thereof is connected to the cooler 7. One end of the cooler 7 is connected to the regenerator 6, and the other end thereof is connected to the low-temperature-side cylinder 4. The high-temperature-side cylinder 3 and the low-temperature-side cylinder 4 are sealed while filled with a working fluid (air in this case), and the high-temperature-side cylinder 3 and the low-temperature-side cylinder 4 drive the Stirling engine 100 by heat supplied from the heater 5.

For example, in the vehicle, the Stirling engine 100 according to the embodiment is used along with the internal combustion engine such as a gasoline engine, and is driven by the heat source which is the exhaust gas of the internal combustion engine. In this case, the heater 5 of the Stirling engine 100 is arranged in an exhaust pipe of the internal combustion engine mounted on the vehicle. The working fluid is heated by thermal energy recovered from the exhaust gas of the internal combustion engine, and the Stirling engine 100 is operated.

In the Stirling engine 100 according to the embodiment, the heater 5 is accommodated in the exhaust pipe. Thus, since the Stirling engine 100 is placed in a limited space in the vehicle, preferably the compact Stirling engine increases a degree of freedom. Therefore, the Stirling engine 100 adopts the configuration in which the high-temperature-side cylinder 3 and the low-temperature-side cylinder 4 are arranged not in V-shape but inline and in parallel.

As shown in FIGS. 1 and 2, the high-temperature-side piston 50a and the low-temperature-side piston 50b are supported while floating through air bearings 12 in the high-temperature-side cylinder 3 and the low-temperature-side cylinder 4, respectively. In order to form the air bearing 12, a distance tc between the piston and the cylinder is set at several ten μm over all circumferences. That is, the Stirling engine 100 has a structure in which the piston performs the reciprocating motion while a piston ring is not used, nor is used lubricating oil. This enables the friction to be decreased between the piston and the cylinder to enhance the thermal efficiency of the Stirling engine 100. Even in the low-temperature-difference running condition such as the exhaust heat recovery of the internal combustion engine, the Stirling engine 100 can be operated by decreasing the friction between the piston and the cylinder.

A solid-state lubricant may be added to inner peripheral surfaces of the high-temperature-side cylinder 3 and low-temperature-side cylinder 4. This enables slide resistance to be further decreased between the piston and the cylinder. In the embodiment, air is used as the working fluid of the Stirling engine, and the air bearing is formed by utilizing the air. When the working fluid is changed, the working fluid constituting the air bearing 12 is also changed. However, even in this case, the air bearing 12 is also referred to as air bearing.

The reciprocating motions of the high-temperature-side piston 50a and low-temperature-side piston 50b are transmitted to the crankshaft 30 by the high-temperature-side piston pin 40a and high-temperature-side connecting rod 20a and the low-temperature-side piston pin 40b and low-temperature-side connecting rod 20b, respectively, and the reciprocating motion is converted into the rotational motion by the crankshaft 30. The crankshaft 30 is supported in the crankcase 9 through a bearing 11. An end portion of the crankshaft 30 is projected to the outside of the crankcase 9 through a sealing portion 13, and the output of the Stirling engine 100 is taken out to the outside from the sealing portion 13. The inside of the crankcase 9 may be pressurized by pressurizing means. This is because the working fluids (air in the embodiment) in the high-temperature-side cylinder 3, the low-temperature-side cylinder 4, and the heater 5 are pressurized to take out the output from the Stirling engine 100 as much as possible.

The reciprocating motions of the high-temperature-side piston 50a and low-temperature-side piston 50b may be transmitted to the crankshaft 30 through a linear approximate mechanism such as a grasshopper mechanism. Therefore, side forces (force toward radial direction of the piston) of the high-temperature-side piston 50a and low-temperature-side piston 50b can substantially be eliminated, so that the high-temperature-side piston 50a and low-temperature-side piston 50b can sufficiently be supported even if the air bearing 12 having a small load is used. Then, the piston apparatus according to the embodiment included in the Stirling engine 100 will be described in detail.

Figure 3:
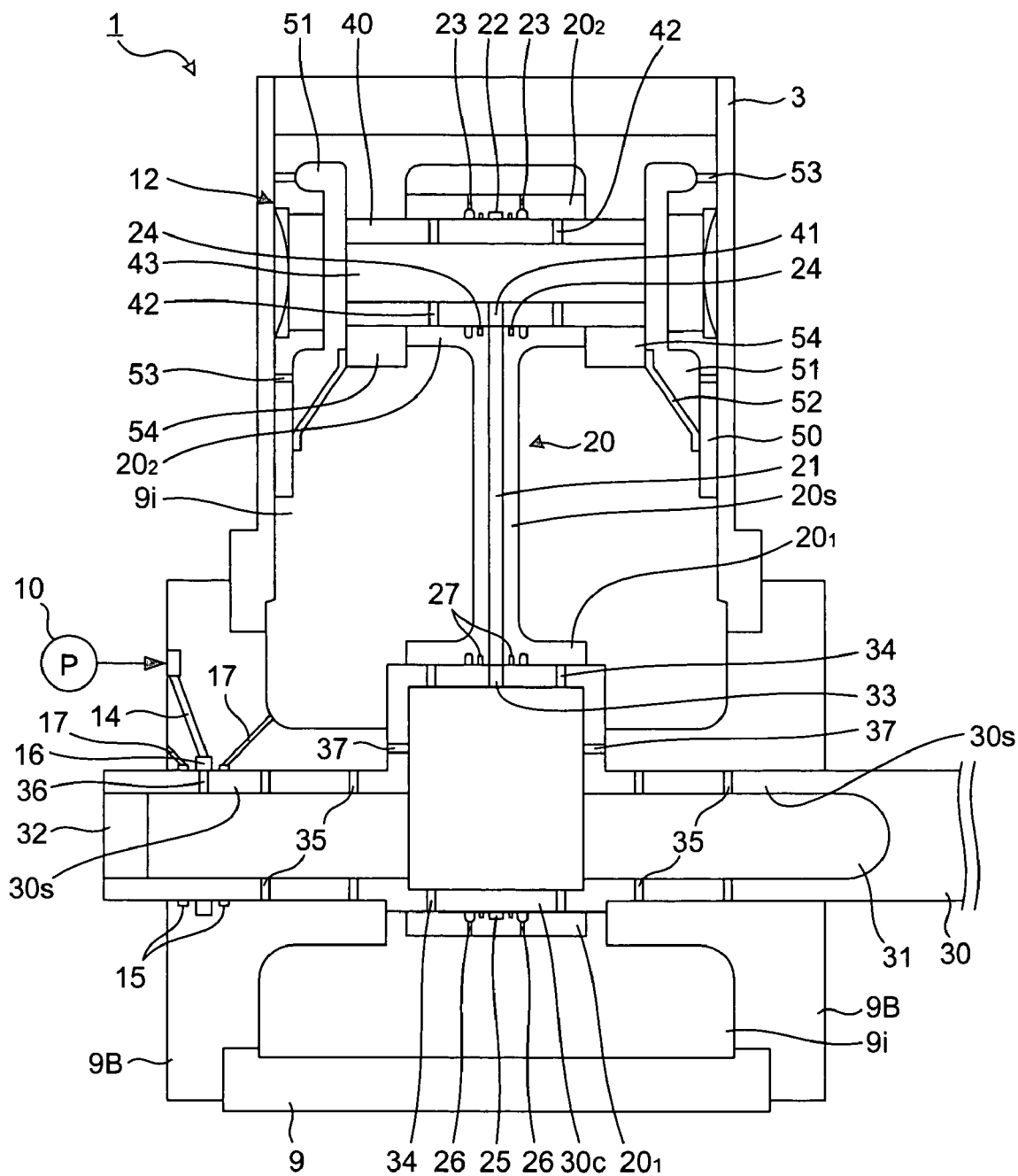
FIG. 3 is an enlarged sectional view showing a piston apparatus according to the embodiment.

FIG. 3 is an enlarged sectional view showing the piston apparatus according to the embodiment. In the Stirling engine 100 according to the embodiment, the high-temperature-side piston apparatus 1 has the same configuration as the low-temperature-side piston apparatus 2. Therefore, the high-temperature-side piston apparatus 1 will be described below. In the following description, for the purpose of convenience, the high-temperature-side piston apparatus 1 is referred to as piston apparatus 1, and the high-temperature-side piston 50a is referred to as piston 50. The high-temperature-side piston pin 40a is referred to as piston pin 40, the high-temperature-side cylinder 3 is referred to as cylinder 3, and the high-temperature-side connecting rod 20a is referred to as connecting rod 20.

The crankshaft 30 included in the piston apparatus 1 is formed while including a rotating shaft portion $30s$ and an eccentric portion $30c$. The rotating shaft portion $30s$ of the crankshaft 30 is journaled in a bearing unit 9B attached to a crankcase 9. A first end portion (hereinafter referred to as large end portion) $20_1$ of the connecting bar (hereinafter referred to as connecting rod) 20 is joined to the eccentric portion $30c$. Therefore, the reciprocating motion of the piston 50 is converted into the rotational motion through the connecting rod 20, and the rotational motion is taken out from the rotating shaft portion $30s$ as the output of the Stirling engine 100.

A hollow portion (hereinafter referred to as crank-side hollow portion) 31 is formed in the crankshaft 30. A cap 32 is attached to one end portion of the crankshaft 30 to seal the crank-side hollow portion 31. A gas supply port 36 communicated with the crank-side hollow portion 31 is formed in the rotating shaft portion $30s$ of the crankshaft 30. The gas supply port 36 is communicated with a gas supply groove 16 formed inside the bearing unit 9B. The gas supply groove 16 is connected through a bearing-unit communication hole 14 to a pump 10 which is gas supply means. Thus, the gas is supplied from the pump 10 into the crank-side hollow portion 31. In the embodiment, the gas supplied from the pump 10 is air and similar to the working fluid of the Stirling engine 100.

At this point, a bearing-side pressure release grooves 15 are formed inside the bearing unit 9B so as to sandwich the gas supply groove 16. Pressure release holes 17 are connected to the bearing-side pressure release grooves 15, and the pressure release holes 17 are communicated with a crankcase interior $9i$ and the outside of the crankcase respectively. Therefore, the gas which leaks to a periphery of the gas supply port 36 provided in the rotating shaft portion $30s$ of the crankshaft 30 is released to the crankcase interior $9i$ or the outside of the crankcase to suppress gas pressure rise at the periphery of the gas supply port 36, which equalizes the pressure in the circumferential direction of the rotating shaft portion $30s$.

Crank-side air inlets 35, 37, and 34 are provided in the crankshaft 30. Specifically, the crank-side air inlets 35 are provided in a side peripheral portion of the rotating shaft portion $30s$ and the crank-side air inlets 34 are provided in the side peripheral portion of the eccentric portion $30c$. The crank-side air inlets 37 are provided in end faces of the eccentric portion $30c$.

The gas introduced into the crank-side hollow portion 31 by the pump 10 flows out from the crank-side air inlets 35 and 37 to form the air bearing between the bearing unit 9B and the crankshaft 30. The gas introduced into the crank-side hollow portion 31 flows also out from the crank-side air inlets 34 provided in the side peripheral portion of the eccentric portion $30c$ to form the air bearing between the eccentric portion $30c$ and the large end portion $20_1$ of the connecting rod 20. Therefore, the friction between the crankshaft 30 and the bearing unit 9B and the friction between the crankshaft 30 and the large end portion $20_1$ of the connecting rod 20 can remarkably be decreased. The air bearing is a so-called hydrostatic air bearing. In the embodiment, the term of "air bearing" is used because the gas introduced into the crank-side hollow portion 31 is the air, and the term of "air bearing" shall include the various kinds of gas except for the air (the same holds in the following).

A gas outflow port 33 is formed in the eccentric portion $30c$ of the crankshaft 30. The gas outflow port 33 feeds the gas in the crank-side hollow portion 31 to a piston pin-side hollow portion 43 in the piston pin 40. A gas passage 21 is formed in the connecting rod 20 whose large end portion $20_1$ is joined to the eccentric portion $30c$ of the crankshaft 30. The air in the crank-side hollow portion 31 flows out from the gas outflow port 33 provided in the eccentric portion $30c$ of the crankshaft 30, and the air is fed in the gas passage 21.

In the connecting rod 20, a second end portion (hereinafter referred to as small end portion) $20_2$ is joined to the piston pin 40. The large end portion $20_1$ and the small end portion $20_2$ are coupled to each other with the connecting rod shaft portion $20s$. The gas passage 21 formed in the inside of the connecting rod 20 (namely, the inside of the connecting rod shaft portion $20s$) is communicated with the insides of the large end portion $20_1$ and small end portion $20_2$. The air in the crank-side hollow portion 31 is released from the gas outflow port 33 provided in the eccentric portion $30c$ of the crankshaft 30, and the air is fed to the small end portion $20_2$ of the connecting rod 20 through the gas passage 21.

A hollow portion (hereinafter referred to as pin-side hollow portion) 43 is formed in the piston pin 40. The pin-side hollow portion 43 is a through hole which pierces through the piston pin 40. A gas inflow port 41 is also provided in the piston pin 40. The gas in the crank-side hollow portion 31 is fed through the gas passage 21 of the connecting rod 20, and the gas inflow port 41 takes the gas into the pin-side hollow portion 43. The side peripheral portion of the piston pin 40 is opened to be connected to the gas inflow port 41, and the gas inflow port 41 is communicated with the pin-side hollow portion 43.

A pin-side air inlet 42 which is communicated with the pin-side hollow portion 43 is provided in the side peripheral portion of the piston pin 40. The gas in the pin-side hollow portion 43 flows out from the pin-side air inlet 42 to form the air bearing between the piston pin 40 and the small end portion $20_2$ of the connecting rod 20. Therefore, the friction between the piston pin 40 and the small end portion $20_2$ of the connecting rod 20 can extremely be decreased.

A hollow portion (hereinafter referred to as piston-side hollow portion) 51 is provided in the piston 50 included in the piston apparatus 1 according to the embodiment. The piston-side hollow portion 51 is communicated with the pin-side hollow portion 43 of the piston pin 40 attached to the piston 50, and the air in the pin-side hollow portion 43 is supplied to the piston-side hollow portion 51. Plural piston-side air inlets 53 are provided in the side peripheral portion of the piston 50 at constant intervals in a circumferential direction of the piston 50. The piston-side air inlet 53 is communicated with the piston-side hollow portion 51, and the gas in the piston-side hollow portion 51 flows out between the piston 50 and the cylinder 3 through the piston-side air inlet 53. Therefore, the air bearing can be formed between the piston 50 and the cylinder 3 to extremely decrease the friction between the piston 50 and the cylinder 3 in the motion of the piston 50. However, it is not always necessary that the piston-side hollow portion 51 and the piston-side air inlet 53 be provided when the side force of the piston 50 is suppressed by the approximate straight-line mechanism or the like.

Figure 4:
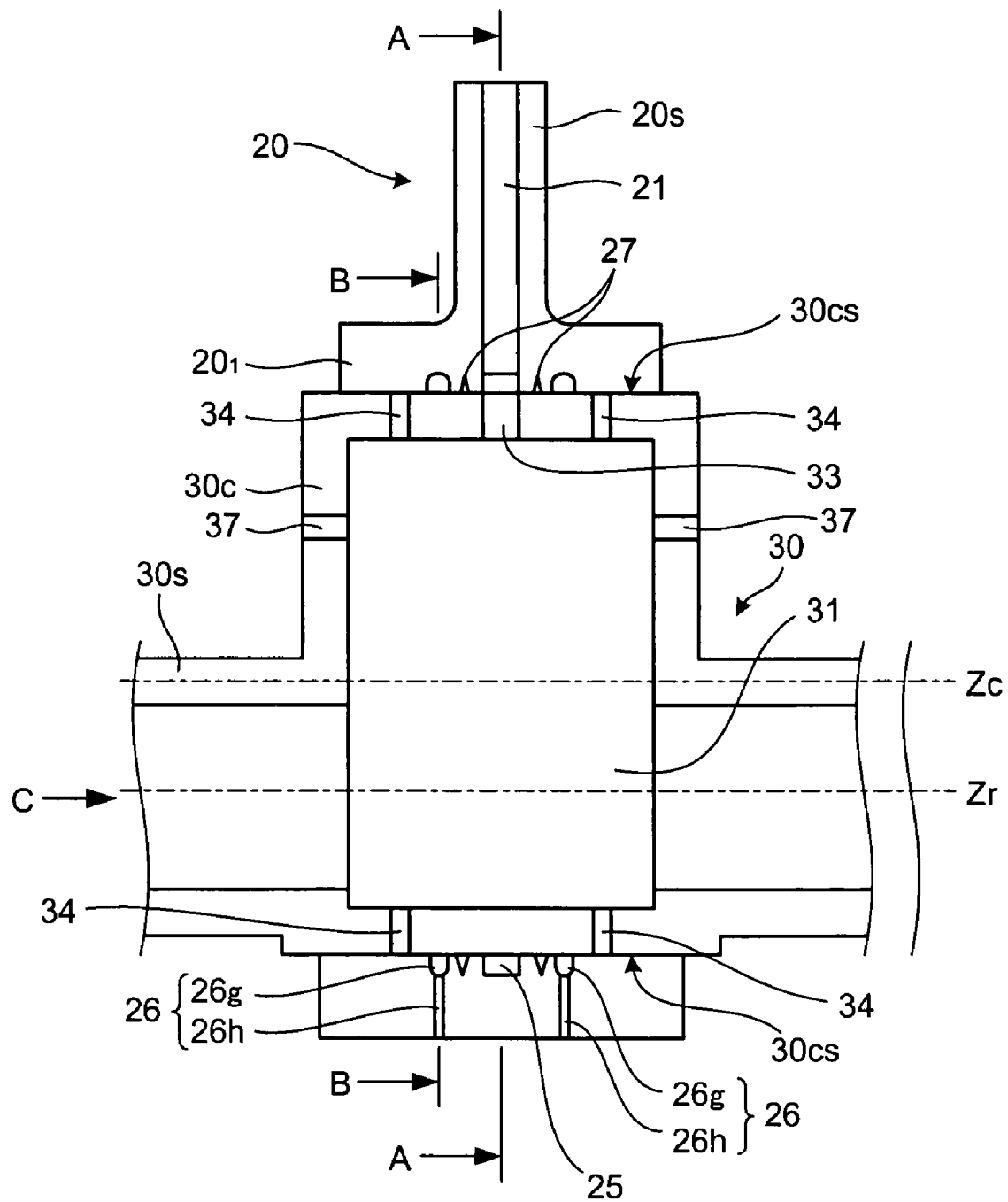
FIG. 4 is a sectional view showing a state in which an eccentric portion of a crankshaft and a large end portion of a connecting rod are joined to each other.
Figure 5A:
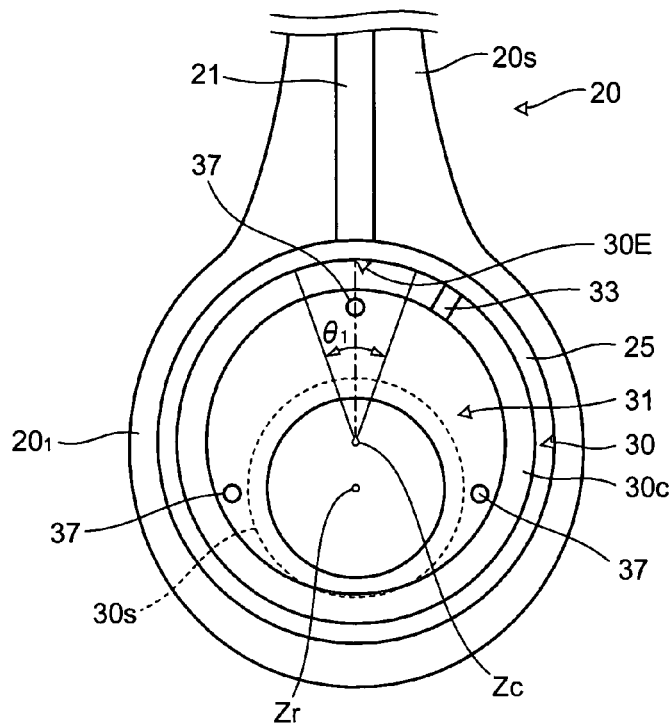
FIG. 5A is a sectional view taken on line A-A of FIG. 4.
Figure 5B:
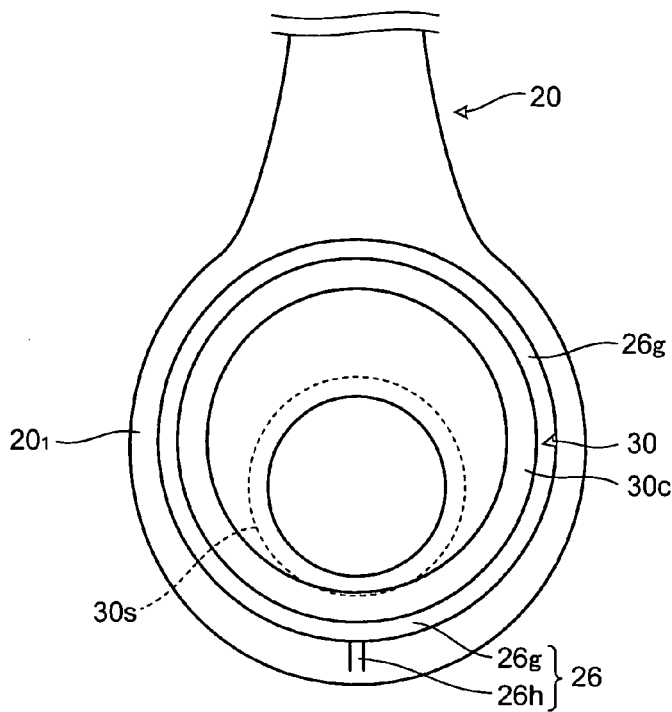
FIG. 5B is a sectional view taken on line B-B of FIG. 4.
Figure 5C:
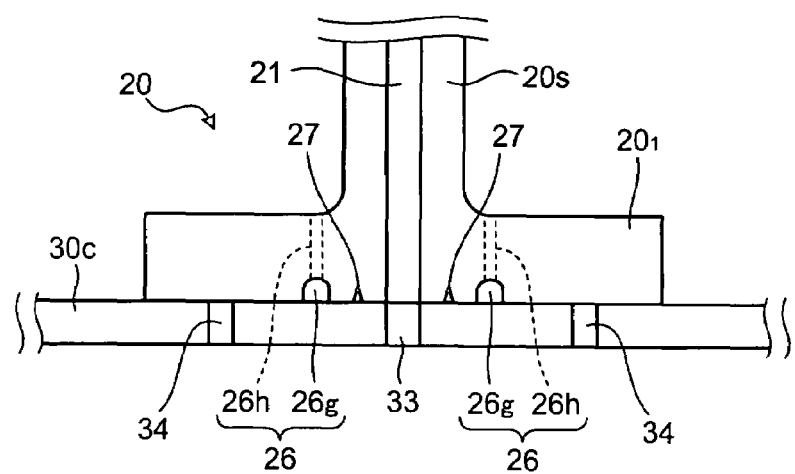
FIG. 5C is a partially sectional view showing the state in which the eccentric portion of the crankshaft and the large end portion of the connecting rod are joined to each other.
Figure 5D:
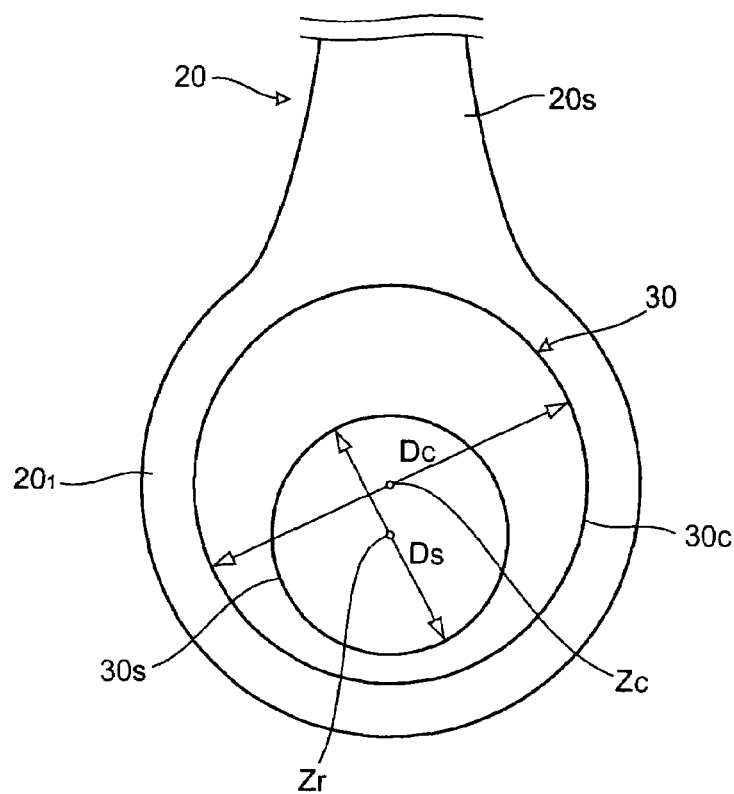
FIG. 5D is a front view when viewed from a direction of an arrow C of FIG. 4.

Then, a configuration in which the eccentric portion 30c of the crankshaft 30 and the large end portion $20_1$ of the connecting rod 20 are joined to each other will be described. FIG. 4 is a sectional view showing a state in which the eccentric portion of the crankshaft and the large end portion of the connecting rod are joined to each other. FIG. 5A is a sectional view taken on line A-A of FIG. 4. FIG. 5B is a sectional view taken on line B-B of FIG. 4. FIG. 5C is a partial sectional view showing the state in which the eccentric portion of the crankshaft and the large end portion of the connecting rod are joined to each other. FIG. 5D is a front view when viewed from a direction of an arrow C of FIG. 4.

As described above, the large end portion $20_1$ of the connecting rod 20 is joined to the eccentric portion 30c of the crankshaft 30 (FIGS. 4 and 5A to 5C). The plural crank-side air inlets 34 shown in FIG. 4 are provided in a side-circumferential portion 30cs of the eccentric portion 30c, and are arranged at substantially equal intervals in a circumferential direction of the eccentric portion 30c. As shown in FIG. 5A, the crank-side air inlets 37 provided in the end face of the eccentric portion 30c of the crankshaft 30 are arranged at substantially equal intervals around an eccentric axis (center axis of the eccentric portion 30c) Zc.

The gas outflow port 33 communicated with the crank-side hollow portion 31 is opened in the surface of the side-circumferential portion 30cs of the eccentric portion 30c. The gas outflow port 33 communicates the crank-side hollow portion 31 with a groove 25 provided in the inner peripheral surface of the large end portion $20_1$ of the connecting rod 20. As shown in FIG. 5A, the groove 25 is formed over the entire inner peripheral surface of the large end portion $20_1$ constituting the connecting rod 20, and the gas outflow port 33 is communicated with the groove 25 while the piston 50 (FIG. 3) is reciprocated one time. The groove 25 can balance the gas pressure in the eccentric portion 30c of the crankshaft 30 with the gas pressure in the circumferential direction of the large end portion $20_1$ of the connecting rod 20 to cause the air bearing formed between the eccentric portion 30c and the large end portion $20_1$ to sufficiently exert the performance.

The gas passage 21 on the side of the large end portion $20_1$ is opened in the groove 25. When the piston 50 (FIG. 3) performs the reciprocating motion, the crankshaft 30 is rotated about the rotational axis Zr and, at that time, the eccentric portion 30c of the crankshaft 30 is rotated in the large end portion $20_1$ of the connecting rod 20. At this point, the gas in the crank-side hollow portion 31 can be fed in the gas passage 21 from the gas outflow port 33 through the groove 25 irrespective of the position of the gas outflow port 33. The groove 25 may be formed in the outer peripheral surface of the eccentric portion 30c included in the crankshaft 30.

As shown in FIG. 5A, preferably the gas outflow port 33 provided in the side peripheral portion of the eccentric portion 30c is arranged while avoiding a portion (most-eccentric portion) 30E where the eccentric portion 30c becomes the most eccentric. In the Stirling engine 100, when the piston 50 (FIG. 3) reaches a top dead point, pressing force acts on the most-eccentric portion 30E from the top dead point toward a bottom dead point. In the case where the inside of the crankcase 9 is pressurized, when the piston 50 reaches the bottom dead point, the pressing force acts on the most-eccentric portion 30E from the bottom dead point toward the top dead point.

The strength of the crankshaft 30 is decreased, when the gas outflow port 33 is provided in the eccentric portion 30c of the crankshaft 30. However, an influence of the pressing force at the top dead point or the bottom dead point can be released when the gas outflow port 33 is provided while avoiding the most-eccentric portion 30E. As a result, the crankshaft 30 has an advantage from the viewpoint of strength. In providing the gas outflow port 33 while the most-eccentric portion 30E is avoided, the gas outflow port 33 is provided so as to avoid a range of a predetermined center angle $\theta_1$ including the most-eccentric portion 30E. The predetermined center angle $\theta_1$ is a range where the influence of the pressing force can not be permitted at the top dead point or the bottom dead point, and the predetermined center angle $\theta_1$ is determined from the specifications of the Stirling engine 100. The number of gas outflow ports 33 is not limited to one. However, in consideration of the strength of the crankshaft 30, preferably the number of gas outflow ports 33 is as small as possible.

As shown in FIGS. 4, 5B, and 5C, in the case where the large end portion $20_1$ of the connecting rod 20 is joined to the eccentric portion 30c of the crankshaft 30, a first pressure release unit 26 which is the large end portion $20_1$ of the connecting rod 20 is provided between the crank-side air inlet 34 and the gas outflow port 33 provided in the eccentric portion 30c of the crankshaft 30. The first pressure release unit 26 includes a first pressure release groove 26g and a first communication hole 26h.

In the embodiment, the first pressure release groove 26g is provided over the entire inner peripheral surface of the large end portion $20_1$ constituting the connecting rod 20. The first pressure release groove 26g may be provided over the entire outer peripheral surface of the eccentric portion 30c constituting the crankshaft 30. In the first communication hole 26h, one end is opened to the surface of the large end portion $20_1$ of the connecting rod 20, and the other end is opened into the first pressure release groove 26g. The first communication hole 26h communicates the first pressure release groove 26g with the crankcase interior 9i (FIG. 3). For the purpose of convenience of the explanation, the position of the first communication hole 26h shown in FIG. 5C is different from the position shown in FIG. 4.

Therefore, the gas which leaks out around the gas outflow port 33 provided in the eccentric portion 30c of the crankshaft 30 is released to the crankcase interior 9i, and the pressure rise is suppressed around the gas outflow port 33 to balance the pressure in the circumferential direction of the eccentric portion 30c. As a result, the air bearing formed between the eccentric portion 30c of the crankshaft 30 and the large end portion 20₁ of the connecting rod 20 can stably exert the performance.

As shown in FIGS. 4 and 5C, in the case where the large end portion 20₁ of the connecting rod 20 is joined to the eccentric portion 30c of the crankshaft 30, a labyrinth seal 27 which is the large end portion 20₁ of the connecting rod 20 is provided between the first pressure release unit 26 and the gas outflow port 33 provided in the eccentric portion 30c of the crankshaft 30. Preferably the amount of gas which leaks out around the gas outflow port 33 provided in the eccentric portion 30c of the crankshaft 30 to flow out from the first pressure release unit 26 to the crankcase interior 9i becomes as small as possible. Accordingly, the labyrinth seal 27 is provided at the position to decrease the amount of gas which flows out to the crankcase interior 9i through the first pressure release unit 26. In the case where the labyrinth seal 27 is provided, at least the one labyrinth seal 27 is provided between the gas outflow port 33 and the first pressure release unit 26. From the view point of the suppression of the gas leakage, it is preferable that the labyrinth seal 27 be brought close to the gas outflow port 33 as much as possible. The number of labyrinth seals 27 is appropriately determined according to the specifications of the Stirling engine 100 or the piston apparatus 1.

As shown in FIG. 5D, a diameter of the rotating shaft portion 30s is Ds in the crankshaft 30, and Ds is smaller than Dc which is the diameter of the eccentric portion 30c in the crankshaft 30 (Ds<Dc). In the rotating shaft portion 30s of the crankshaft 30, a cross-sectional shape perpendicular to the rotational axis Zr of the crankshaft 30 is included in the cross-sectional shape perpendicular to the rotational axis Zr of the crankshaft 30 in the eccentric portion 30c. Therefore, forming the crankshaft 30 becomes easy, and forming accuracy of the eccentric portion 30c is easily improved.

Figure 6:
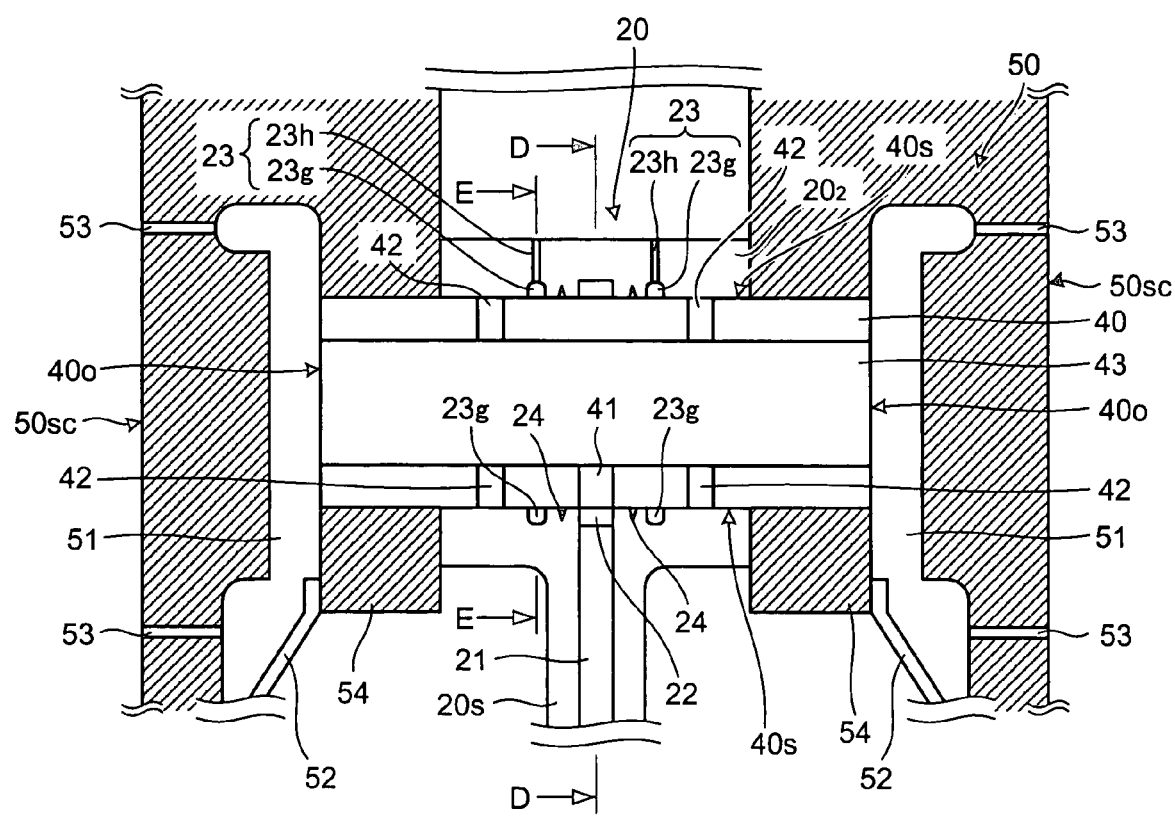
FIG. 6 is a sectional view showing the state in which the eccentric portion of the crankshaft and the large end portion of the connecting rod are joined to each other.
Figure 7A:
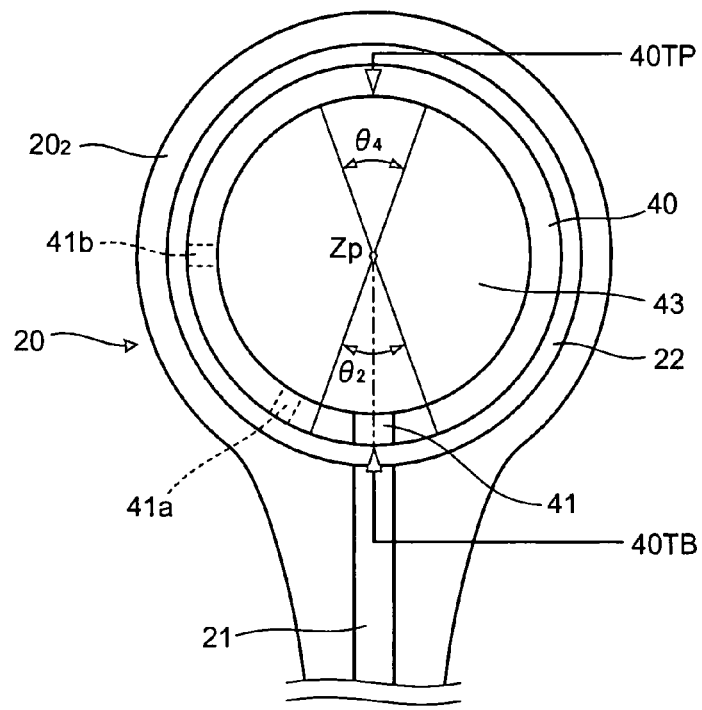
FIG. 7A is a sectional view taken on line D-D of FIG. 6.
Figure 7B:
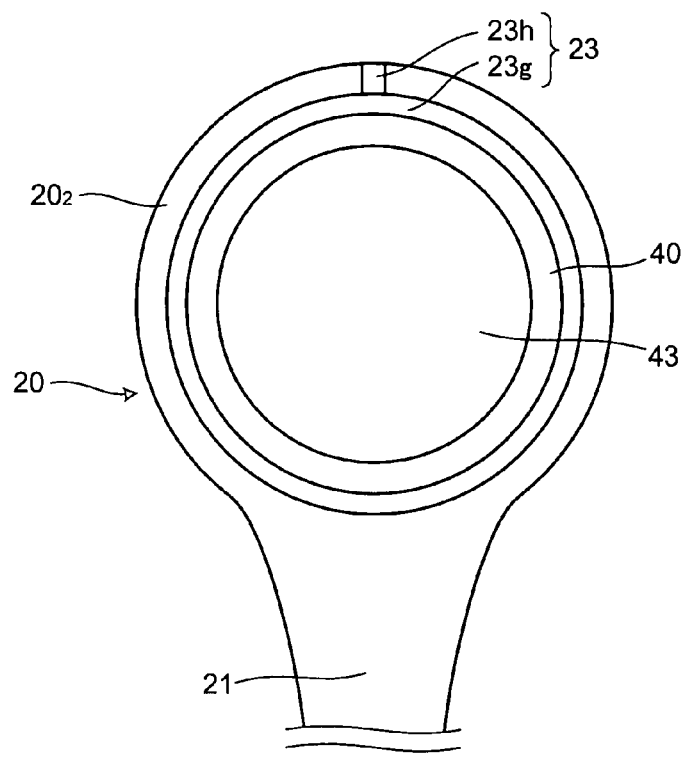
FIG. 7B is a sectional view taken on line E-E of FIG. 6.

Then, the configuration in which the piston pin 40 and the small end portion 20₂ of the connecting rod 20 are joined to each other will be described. FIG. 6 is a sectional view showing the state in which the eccentric portion of the crankshaft and the large end portion of the connecting rod are joined to each other. FIG. 7A is a sectional view taken on line D-D of FIG. 6. FIG. 7B is a sectional view taken on line E-E of FIG. 6. As shown in FIG. 6, the piston pin 40 is inserted into a fitting seat 54 of the piston 50, and the piston pin 40 is fixed to the piston 50 by fixing means.

As described above, a skirting portion side is closed by a partition member 52 in the piston 50, which forms the piston-side hollow portion 51 in the piston 50. The gas in the piston-side hollow portion 51 flows out through the piston-side air inlet 53 opened in the side peripheral portion 50sc of the piston 50 to form the air bearing between the cylinder 3 (FIG. 2) and the piston 50. Piston pin opening portions 40o provided at both end portions of the piston pin 40 are opened in the piston-side hollow portion 51, and the piston pin opening portions 40o communicate the pin-side hollow portion 43 with the piston-side hollow portion 51. Therefore, the gas in the pin-side hollow portion 43 can be supplied to the piston-side hollow portion 51 by the simple structure.

As described above, the small end portion 20₂ of the connecting rod 20 is joined to the piston pin 40 (FIGS. 6, 7A, and 7B). The plural pin-side air inlets 42 shown in FIG. 6 are provided in a side-peripheral portion 40s of the piston pin 40, and the pin-side air inlets 42 are arranged at substantially equal intervals in the circumferential direction of the piston pin 40.

The gas inflow port 41 communicated with the pin-side hollow portion 43 is opened in the side-peripheral portion 40s of the piston pin 40. The gas inflow port 41 communicates the pin-side hollow portion 43 with a groove 22 provided in the inner peripheral surface of the small end portion 20₂ of the connecting rod 20. As shown in FIG. 7A, the groove 22 is formed over the entire inner peripheral surface of the small end portion 20₂ constituting the connecting rod 20, and the gas inflow port 41 is communicated with the groove 22 while the piston 50 (FIG. 3) is reciprocated one time. The groove 22 can balance the gas pressure in the piston pin 40 with the gas pressure in the circumferential direction of the small end portion 20₂ of the connecting rod 20 to cause the air bearing formed between the piston pin 40 and the small end portion 20₂ to sufficiently exert the performance.

The gas passage 21 on the side of the small end portion 20₂ is opened in the groove 22. When the piston 50 (FIG. 6) performs the reciprocating motion, the crankshaft 30 (FIG. 3) is rotated about the rotational axis, and the connecting rod 20 is oscillated about the piston pin 40 within a predetermined angle in a plane perpendicular to the axial direction of the piston pin 40. At this point, the gas in the gas passage 21 of the connecting rod 20 can be fed in the pin-side hollow portion 43 from the gas inflow port 41 through the groove 22 irrespective of the position of the gas inflow port 41. The groove 22 may be formed in the outer peripheral surface of the piston pin 40.

As shown in FIG. 7A, preferably the gas inflow port 41 provided in the side peripheral portion of the piston pin 40 is arranged while avoiding a crankshaft-side top portion 40TB and a piston top surface-side top portion 40TP of the piston pin 40 (41a and 41b of FIG. 7B). In the Stirling engine 100, when the piston 50 (FIGS. 3 and 6) reaches the top dead point, the pressing force acts on the piston top surface-side top portion 40TP from the top dead point toward the bottom dead point. In the case where the inside of the crankcase 9 is pressurized, when the piston 50 reaches the bottom dead point, the pressing force acts on the crankshaft-side top portion 40TB from the bottom dead point toward the top dead point.

When the gas inflow port 41 is provided in the piston pin 40, the strength of the crankshaft 30 is decreased. However, the influence of the pressing force at the top dead point can be released when the gas outflow port 41 is provided while avoiding the crankshaft-side top portion 40TB and the piston top surface-side top portion 40TP of the piston pin 40. As a result, the piston pin 40 has an advantage from the viewpoint of strength.

In providing the gas inflow port 41 while the crankshaft-side top portion 40TB is avoided, the gas inflow port 41 is provided so as to avoid a range of a predetermined center angle $\theta_2$ including the crankshaft-side top portion 40TB of the piston pin 40. In providing the gas inflow port 41 while the piston top surface-side top portion 40TP of the piston pin 40 is avoided, the gas inflow port 41 is provided so as to avoid a range of a predetermined center angle $\theta_4$ including the piston top surface-side top portion 40TP of the piston pin 40. The predetermined center angles $\theta_2$ and $\theta_4$ are a range where the influence of the pressing force can not be permitted at the top dead point or the bottom dead point, and predetermined center angles $\theta_2$ and $\theta_4$ are determined from the specifications of the Stirling engine 100. The number of gas inflow ports 41 is not limited to one. However, in consideration of the strength of the piston pin 40, preferably the number of gas inflow ports 41 is as small as possible.

As shown in FIGS. 6 and 7B, in the case where the small end portion $20_2$ of the connecting rod 20 is joined to the piston pin 40, a second pressure release unit 23 which is the small end portion $20_2$ of the connecting rod 20 is provided between the pin-side air inlet 42 and the gas inflow port 41 provided in the piston pin 40. The second pressure release unit 23 includes a second pressure release groove 23g and a second communication hole 23h.

In the embodiment, the second pressure release groove 23g is provided over the entire inner peripheral surface of the small end portion $20_2$ constituting the connecting rod 20. The second pressure release groove 23g may be provided over the entire outer peripheral surface of the piston pin 40. In the second communication hole 23h, one end is opened to the surface of the small end portion $20_2$ of the connecting rod 20, and the other end is opened into the second pressure release groove 23g. The second communication hole 23h communicates the second pressure release groove 23g with the crankcase interior 9i (FIG. 3).

Therefore, the gas which leaks out around the gas inflow port 41 provided in the piston pin 40 is released to the crankcase interior 9i, and the pressure rise is suppressed around the gas inflow port 41 to balance the pressure in the circumferential direction of the piston pin 40. As a result, the air bearing formed between the piston pin 40 and the small end portion $20_2$ of the connecting rod 20 can stably exert the performance.

As shown in FIG. 6, in the case where the small end portion $20_2$ of the connecting rod 20 is joined to the piston pin 40, a labyrinth seal 24 which is the small end portion $20_2$ of the connecting rod 20 is provided between the second pressure release unit 23 and the gas inflow port 41 provided in the piston pin 40. Preferably the amount of gas which leaks out around the gas inflow port 41 provided in the piston pin 40 to flow out from the second pressure release unit 23 to the crankcase interior 9i becomes as small as possible. Accordingly, the labyrinth seal 24 is provided at the position to decrease the amount of gas which flows out to the crankcase interior 9i through the second pressure release unit 23. In the case where the labyrinth seal 24 is provided, at least one labyrinth seal 24 is provided between the gas inflow port 41 and the second pressure release unit 23. The number of labyrinth seals 24 is appropriately determined according to the specifications of the Stirling engine 100 or the piston apparatus 1. From the view point of the suppression of the gas leakage, it is preferable that the labyrinth seal 24 be brought close to the gas inflow port 41 as much as possible.

Figure 8A:
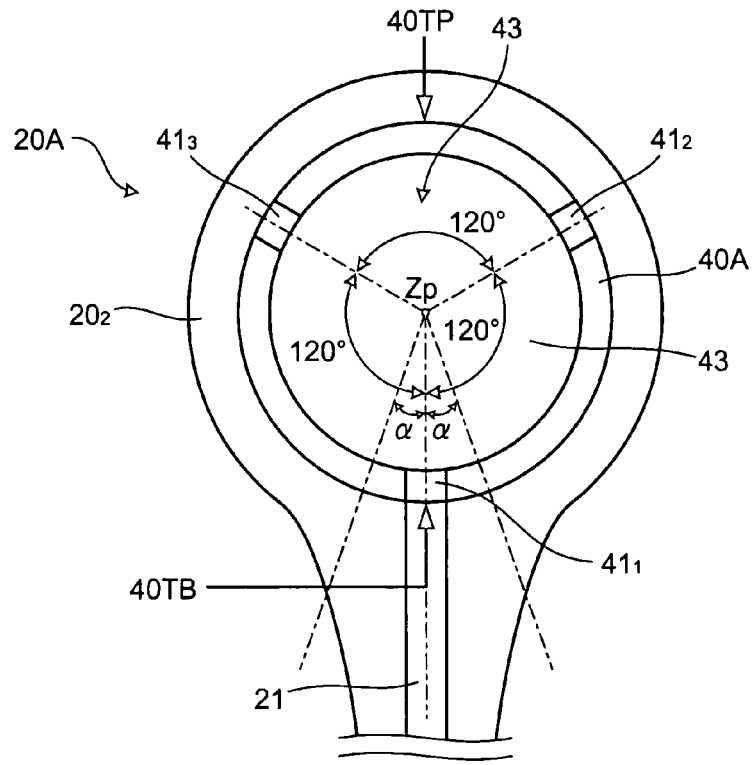
FIG. 8A is a sectional view showing another example in which a piston pin and the connecting rod according to the embodiment are joined to each other.
Figure 8B:
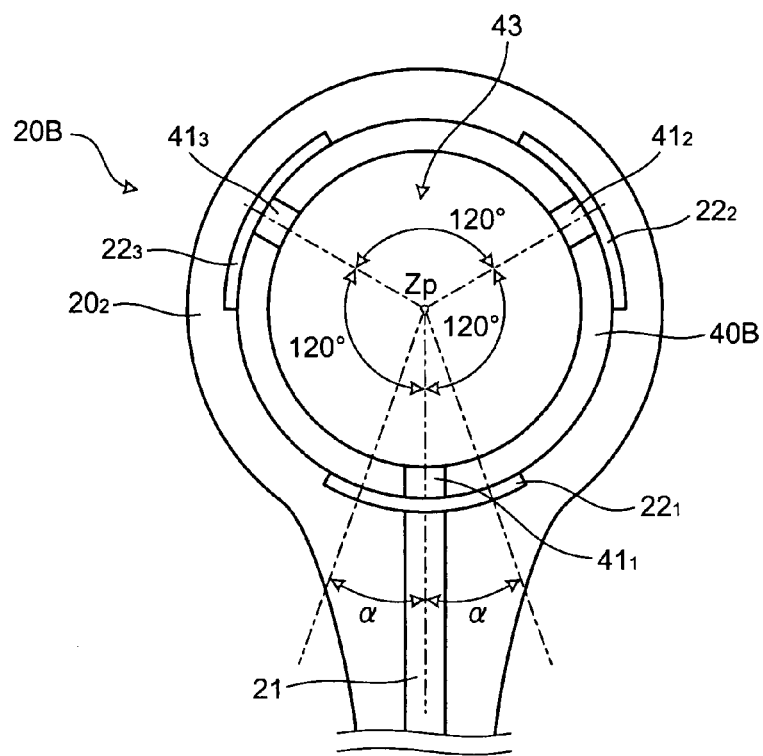
FIG. 8B is a sectional view showing another example in which the piston pin and the connecting rod according to the embodiment are joined to each other.
Figure 8C:
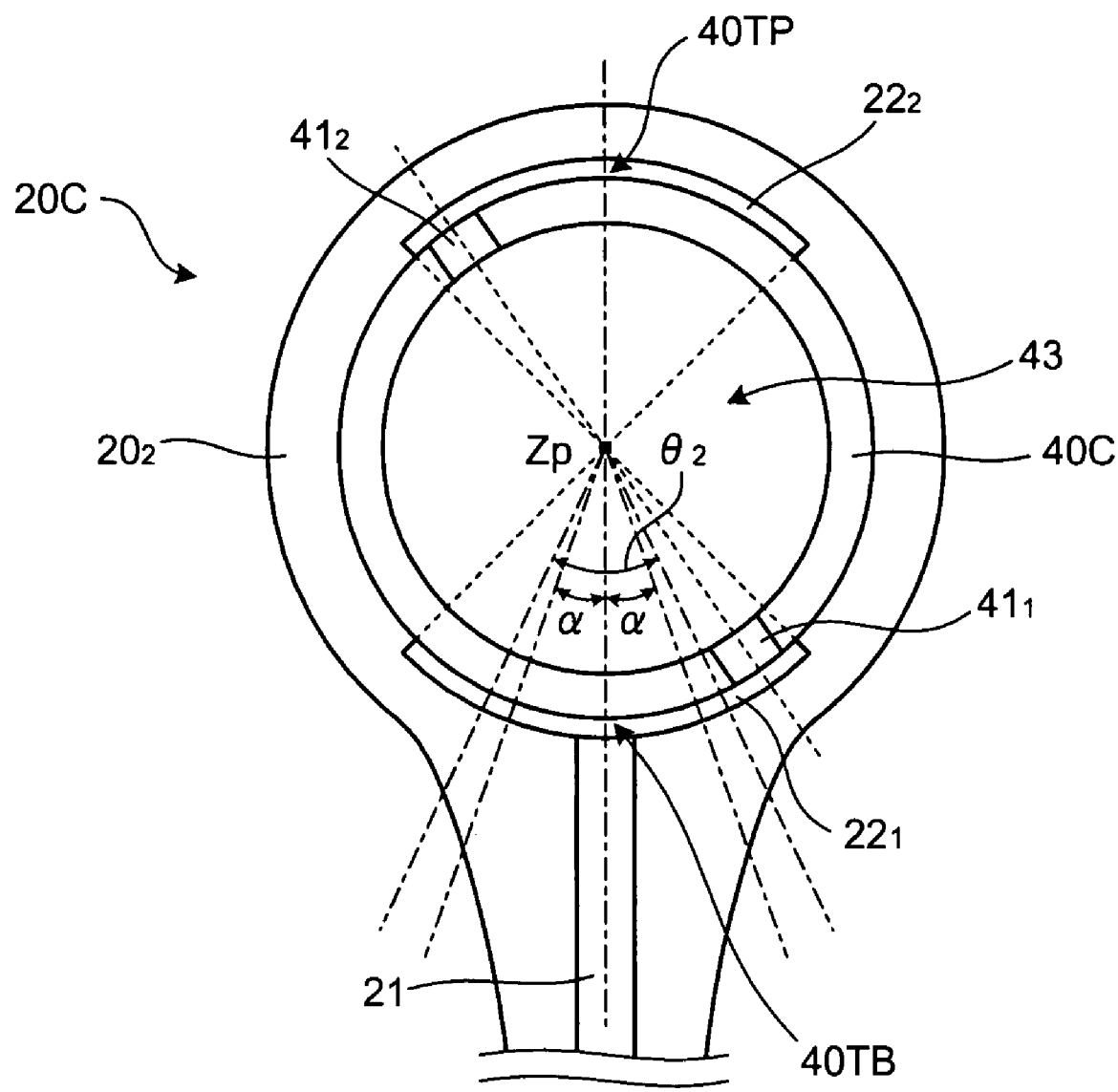
FIG. 8C is a sectional view showing another example in which the piston pin and the connecting rod according to the embodiment are joined to each other.

FIGS. 8A to 8C are a sectional view showing another example in which the piston pin and the connecting rod according to the embodiment are joined to each other. The gas is supplied from the pump 10 (FIG. 3) to the pin-side hollow portion 43 in a piston pin 40A through the crank-side hollow portion 31 and the gas passage 21 of the connecting rod 20A. At this point, because the pin-side hollow portion 43 has a certain degree of volume, the pin-side hollow portion 43 has the function as a buffer. That is, depending on the time, even if the gas supply is interrupted for a short time, the gas pressure in the pin-side hollow portion 43 is not decreased too low to be able to form the air bearing between the piston pin 40A and the small end portion $20_2$ of the connecting rod 20A.

Accordingly, it is not always necessary that the gas passage 21 be communicated with the pin-side hollow portion 43. As shown in FIG. 8A, the connecting rod 20A performs the oscillating motion about the piston pin 40A within the range of swing angle 2×α while the piston 50 is reciprocated one time. Therefore, a period in which the gas passage 21 and a first gas inflow port $41_1$ overlap each other while the piston 50 (FIG. 6) is reciprocated one time is longer than a period in which the gas passage 21 and the gas outflow port 33 (FIGS. 4 and 5A) of the eccentric portion 30c of the crankshaft 30 overlap each other. As a result, a period in which the gas supply into the pin-side hollow portion 43 is interrupted is relatively short.

Accordingly, the air bearing can be maintained between the piston pin 40A and the small end portion $20_2$ of the connecting rod 20A, even if the groove (FIGS. 6 and 7A) is not provided in the circumferential direction in the inner peripheral surface of the small end portion of the connecting rod 20. The groove 22 (FIGS. 6 and 7A) is not provided in the circumferential direction in the inner peripheral surface of the small end portion $20_2$ of the connecting rod 20A shown in FIG. 8A. This enables the connecting rod 20A to be easily formed. However, when only the first gas inflow port $41_1$ is provided, there is a fear that the pressure balance is disrupted in the circumferential direction of the piston pin 40A. Therefore, the first, second, and third gas inflow ports $41_1$, $41_2$, and $41_3$ are arranged at intervals of the center angle of 120 degrees with respect to a center axis Zp of the piston pin 40A. This enables the balance of the gas pressure to be maintained in the circumferential direction of the piston pin 40A to cause the air bearing formed between the piston pin 40A and the small end portion $20_2$ of the connecting rod 20A to stably exert the function.

As described above, in consideration of the strength of the piston pin 40A, preferably the first, second, and third gas inflow ports $41_1$, $41_2$, and $41_3$ are arranged so as to avoid the crankshaft-side top portion 40TB and piston top surface-side top portion 40TP of the piston pin 40A. That is, the first, second, and third gas inflow ports $41_1$, $41_2$, and $41_3$ are arranged so as to avoid the range of the predetermined center angle $\theta_2$ including the crankshaft-side top portion 40TB of the piston pin 40a and the range of the predetermined center angle $\theta_4$ including the piston top surface-side top portion 40TP of the piston pin 40a (see FIG. 7A for the center angles $\theta_2$ and $\theta_4$).

In the example shown in FIG. 8B, the gas passage 21 of a connecting rod 20B and the first gas inflow port $41_1$ of a piston pin 40B are always communicated to each other. Therefore, in consideration of the oscillation of a connecting rod 20B, a first groove $22_1$ is provided within a range slightly larger than the swing angle 2×α of the connecting rod 20B in the inner peripheral surface of the small end portion $20_2$ of the connecting rod 20B. This enables the gas passage 21 of the connecting rod 20B and the pin-side hollow portion 43 in the piston pin 40B to be always communicated to each other.

The first, second, and third gas inflow ports $41_1$, $41_2$, and $41_3$ are arranged at intervals of the center angle of 120 degrees with respect to the center axis Zp of the piston pin 40A, and the first, second, and third grooves $22_1$, $22_2$, and $22_3$ are arranged corresponding to the first, second, and third gas inflow ports $41_1$, $41_2$, and $41_3$. This enables the balance of the gas pressure to be maintained in the circumferential direction of the piston pin 40A. The first, second, and third gas inflow ports $41_1$, $41_2$, and $41_3$ are communicated with the first, second, and third grooves $22_1$, $22_2$, and $22_3$ while the piston 50 (FIG. 6) is reciprocated one time.

In the example shown in FIG. 8C, in consideration of the strength of a piston pin 40C, as described above, the first gas inflow port $41_1$ is arranged while avoiding the crankshaft-side top portion 40TB of the piston pin 40C. That is, the first gas inflow port $41_1$ is arranged so as to avoid the range of the predetermined center angle $\theta_2$ including the crankshaft-side top portion 40TB of the piston pin 40C. Therefore, the period in which the first gas inflow port $41_1$ and the gas passage 21 of a connecting rod 20C overlap each other becomes shortened, and there is a fear that the gas is not sufficiently supplied into the pin-side hollow portion 43. In order to avoid this state, in consideration of the center angle $\theta_2$, the first grooves $22_1$ is provided within the range slightly larger than the center angle $\theta_2$ in the inner peripheral surface of the small end portion $20_2$ of the connecting rod 20C. This enables the gas passage 21 of the connecting rod 20C and the pin-side hollow portion 43 in the piston pin 40C to be always communicated to each other.

When only the first gas inflow port $41_1$ is provided, there is a fear that the pressure balance is disrupted in the circumferential direction of the piston pin 40A. Therefore, in the piston pin 40C, the second gas inflow port $41_2$ is arranged symmetrical to the first gas inflow port $41_1$ with respect to the center axis Zp of the piston pin 40C. In the inner peripheral surface of the small end portion $20_2$ of the connecting rod 20C, the second groove $22_2$ is arranged symmetrical to the first groove $22_1$ with respect to the center axis Zp of the piston pin 40C. This enables the balance of the gas pressure to be maintained in the circumferential direction of the piston pin 40C to cause the air bearing formed between the piston pin 40C and the small end portion $20_2$ of the connecting rod 20C to stably exert the function. The first and second gas inflow ports $41_1$ and $41_2$ are communicated with the first and second grooves $22_1$ and $22_2$ while the piston 50 (FIG. 6) is reciprocated one time.

The range where the first groove $22_1$ is provided includes the crankshaft-side top portion 40TB of the piston pin 40C. The range where the second groove $22_2$ is provided includes the piston top surface-side top portion 40TP of the piston pin 40C. When the piston 50 (FIG. 6) reaches the top dead point or the bottom dead point, the pressing force acts on the piston top surface-side top portion 40TP or the crankshaft-side top portion 40TB of the piston pin 40C. In the structure shown in FIG. 8C in which the piston pin 40C and the connecting rod 20C are joined to each other, the gas pressure in the first and second grooves $22_1$ and $22_2$ provided in the inner peripheral surface of the small end portion $20_2$ of the connecting rod 20C can withstand the pressing force.

(Modification)

Figure 9:
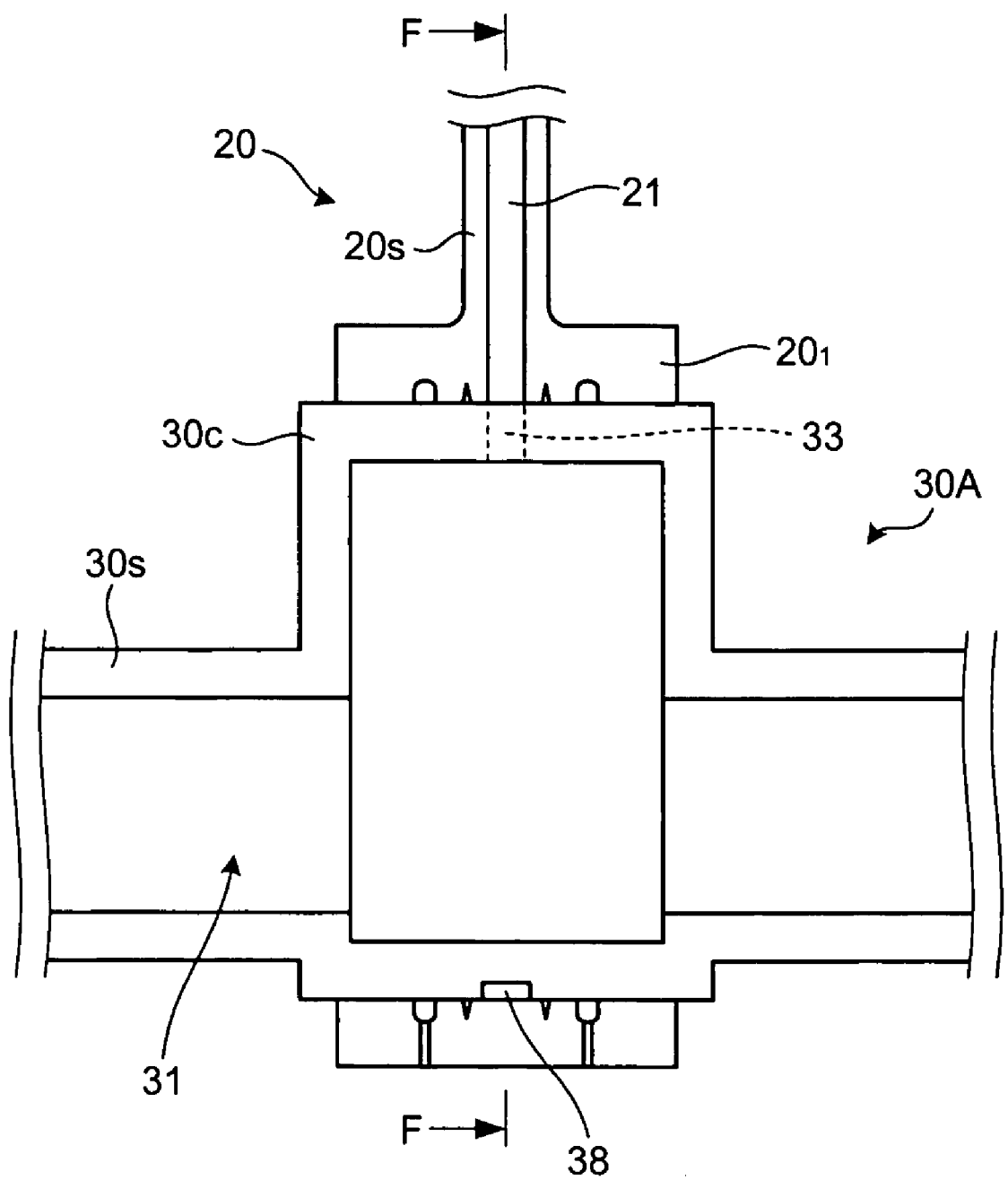
FIG. 9 is a sectional view showing a structure in which the crankshaft and the connecting rod according to a modification of the embodiment are joined to each other.

A modification of the embodiment is characterized in that a groove is provided in the outer peripheral surface of the eccentric portion of the crankshaft and the groove is formed while avoiding a portion facing the rotational axis side of the crankshaft with respect to a portion (most-eccentric portion) where the eccentric portion becomes the most eccentric. The groove is provided in the circumferential direction of the eccentric portion and the groove includes the most-eccentric portion of the eccentric portion. FIG. 9 is a sectional view showing a structure in which the crankshaft and the connecting rod according to a modification of the embodiment are joined to each other.

Figure 10A:
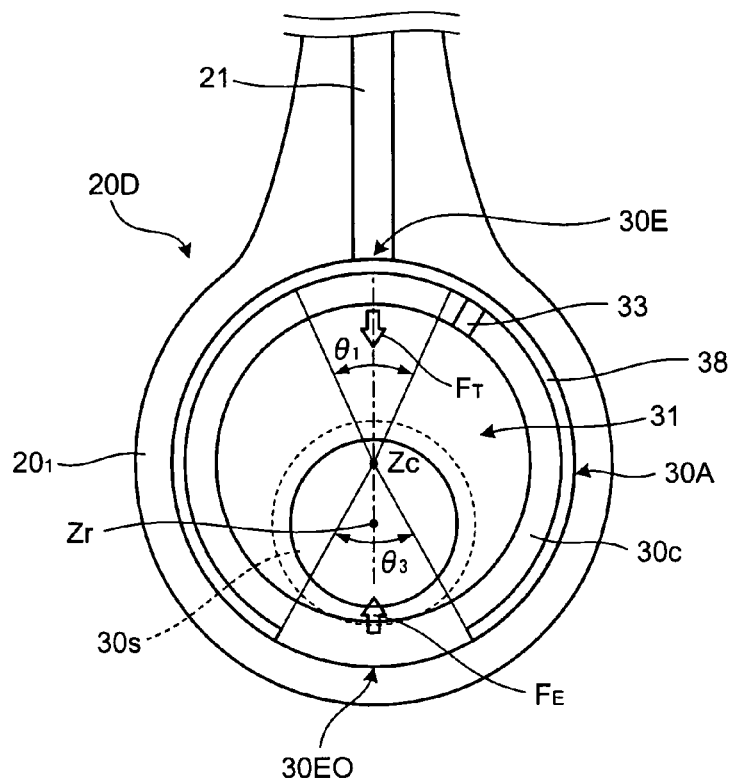
FIG. 10A is a sectional view taken on line F-F of FIG. 9.
Figure 10B:
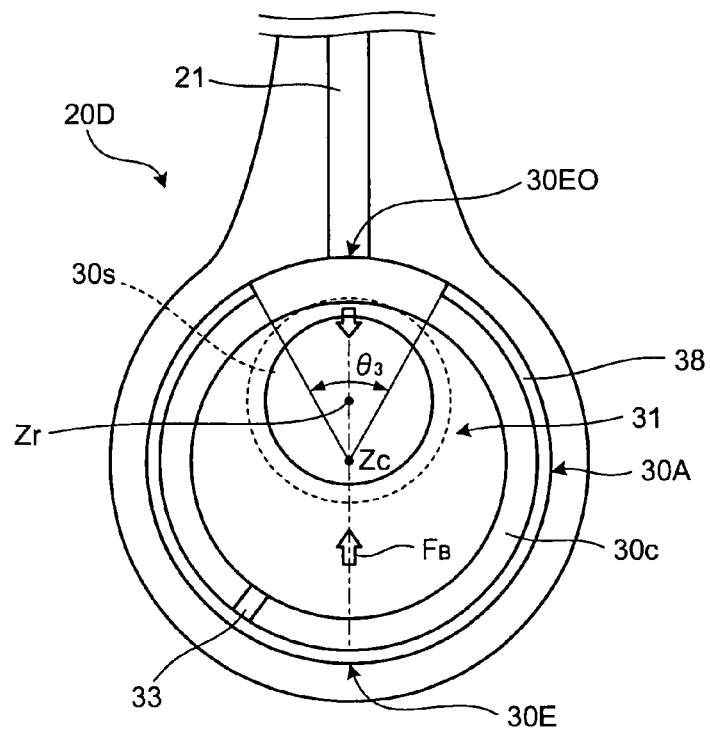
FIG. 10B is a sectional view taken on line F-F of FIG. 9.

FIGS. 10A and 10B are a sectional view taken on line F-F of FIG. 9.

As shown in FIGS. 9 and 10A, in a crankshaft 30A according to the modification, a groove 38 is formed in the circumferential direction of the eccentric portion 30c in the outer peripheral surface of the eccentric portion 30c. As shown in FIG. 10A, the groove 38 includes the most-eccentric portion 30E of the eccentric portion 30c, and the groove 38 is formed while avoiding a portion (most-eccentric portion facing portion) 30EO facing the side of rotational axis Zr of the crankshaft with respect to the most-eccentric portion 30E. Therefore, in the groove 38, the cross-sectional shape perpendicular to the rotational axis Zr is formed in a substantial C-shape.

That is, as shown in FIG. 10A, the groove 38 is not provided in the range of a predetermined center angle $\theta_3$ including the most-eccentric portion facing portion 30EO with respect to an eccentric axis Zc, and the groove is provided while avoiding the center angle $\theta_3$. Therefore, the gas outflow port 33 is communicated with the groove 38 while the piston 50 (FIG. 3) is reciprocated one time. In consideration of the strength of the crankshaft 30, the gas outflow port 33 which communicates the groove 38 with the crank-side hollow portion 31 is provided while avoiding the most-eccentric portion 30E of the eccentric portion 30. This point is already described above in the embodiment.

FIG. 10A shows a state in which the piston 50 (FIG. 3) is located at the top dead point and FIG. 10B shows the state in which the piston 50 is located at the bottom dead point. When the groove 38 is formed like the crankshaft 30A according to the modification, in the gas pressure existing between the eccentric portion 30c and the large end portion $20_1$ of a connecting rod 20D, a bias is generated in the circumferential direction of the eccentric portion 30c. As a result, the gas pressure becomes off-balance in the circumferential direction of the eccentric portion 30c, and pressing force $F_E$ from the most-eccentric portion facing portion 30EO toward the most-eccentric portion 30E acts on the eccentric portion 30c from the large end portion $20_1$ of the connecting rod 20D.

As described above, when the piston 50 reaches the top dead point, pressing force $F_T$ from the top dead point toward the bottom dead point acts on the most-eccentric portion 30E (FIG. 10A). According to the structure of the modification in which the crankshaft and the connecting rod are joined to each other, the pressing force $F_E$ which is generated by providing the groove 38 while the most-eccentric portion facing portion 30EO is avoided supports the pressing force $F_T$ generated at the top dead point. In the case where the inside of the crankcase 9 is pressurized, when the piston 50 reaches the bottom dead point, pressing force $F_B$ acts on the most-eccentric portion 30E from the bottom dead point toward the top dead point (FIG. 10B). According to the structure of the modification in which the crankshaft and the connecting rod are joined to each other, the pressing force $F_E$ which is generated by providing the groove 38 while the most-eccentric portion facing portion 30EO is avoided supports the pressing force $F_B$ generated at the bottom dead point.

At the top dead point or bottom dead point of the piston 50, the largest pressing force $F_T$ or $F_E$ acts on the eccentric portion 30c of the crankshaft 30A during the reciprocating motion of the piston 50. However, according to the modification, since the pressing force $F_T$ or $F_E$ can be released, there is generated an advantage from the viewpoint of the strength of the crankshaft 30A or the eccentric portion 30c thereof. In this case the center angle $\theta_3$ is determined in consideration of the pressing force $F_T$ or $F_E$ at the top dead point or bottom dead point, the pressure of the gas introduced into the groove 38, an opening area of the groove, and the like.

As described above, in the embodiments and the modification, the air bearing is formed by causing the gas to flow out between the crankshaft and the bearing and between the eccentric portion of the crankshaft and the large end portion of the connecting rod from the crank-side hollow portion provided inside the crankshaft. The air bearing is also formed by causing the gas to flow out between the piston pin and the small end portion of the connecting rod from the pin-side hollow portion provided inside the piston pin. Therefore, in the heat engine which converts the reciprocating motion of the piston into the rotational motion, the internal friction can be decreased to take out the power from the heat engine even if the heat engine has the low temperature.

In the embodiments and the modification, the first pressure release unit is provided between the crank-side air inlet and the gas outflow port provided in the eccentric portion of the crankshaft, and the second pressure release unit is provided between the pin-side air inlet and the gas inflow port provided in the piston pin. Therefore, the balance of the gas pressure distribution can be maintained in the circumferential direction of the eccentric portion of the crankshaft and in the circumferential direction of the piston pin to stably exert the function of the air bearing.

In the above description, the configuration, the action, and the effect have been explained in the case where the heat engine including the piston apparatus is the Stirling engine. However, the piston apparatus according to the embodiment can also easily be applied to the heat engine and various kinds of apparatuses except for the Stirling engine. In such cases, the invention has the same usability as that of the embodiment.

INDUSTRIAL APPLICABILITY

The piston apparatus of the present invention is suitable to the decrease in friction, and particularly suitable to the decrease in friction in the portion where the crankshaft and the connecting rod are joined and in the portion where connecting rod and the piston pin are joined.

The invention claimed is:

1. A piston apparatus comprising:
a piston pin that includes a pin-side air inlet and a gas inflow port, gas being caused to flow out through the pin-side air inlet from a pin-side hollow portion provided in the piston pin, the gas being taken in the pin-side hollow portion through the gas inflow port, the piston pin being attached to a piston which performs reciprocating motion in a cylinder;
a crankshaft that includes a crank-side air inlet and a gas outflow port, the gas being caused to flow out through the crank-side air inlet from a crank-side hollow portion provided in the crankshaft, the gas in the crank-side hollow portion being fed in the pin-side hollow portion through the gas outflow port;
a connecting rod that has a first end portion and a second end portion, the first end portion being joined to an eccentric portion of the crankshaft, the second end portion being joined to the piston pin, the connecting rod feeding the gas in the crank-side hollow portion to the pin-side hollow portion through a gas passage formed in the connecting rod;
a first pressure release unit that is provided between the gas outflow port and the crank-side air inlet; and
a second pressure release unit that is provided between the gas inflow port and the pin-side air inlet.

2. The piston apparatus according to claim 1, wherein labyrinth seals are provided between the first pressure release unit and the gas outflow port and between the second pressure release unit and the gas inflow port.

3. A piston apparatus comprising:
a piston pin that includes a pin-side air inlet and a gas inflow port, gas being caused to flow out through the pin-side air inlet from a pin-side hollow portion provided in the piston pin, the gas being taken in the pin-side hollow portion through the gas inflow port, the piston pin being attached to a piston which performs reciprocating motion in a cylinder;
a crankshaft that includes a crank-side air inlet and a gas outflow port, the gas being caused to flow out through the crank-side air inlet from a crank-side hollow portion provided in the crankshaft, the gas in the crank-side hollow portion being fed in the pin-side hollow portion through the gas outflow port; and
a connecting rod that has a first end portion and a second end portion, the first end portion being joined to an eccentric portion of the crankshaft, the second end portion being joined to the piston pin, the connecting rod feeding the gas in the crank-side hollow portion to the pin-side hollow portion through a gas passage formed in the connecting rod,
wherein the gas outflow port included in the crankshaft is provided while avoiding a portion where the eccentric portion becomes the most eccentric.

4. A piston apparatus comprising:
a piston pin that includes a pin-side air inlet and a gas inflow port, gas being caused to flow out through the pin-side air inlet from a pin-side hollow portion provided in the piston pin, the gas being taken in the pin-side hollow portion through the gas inflow port, the piston pin being attached to a piston which performs reciprocating motion in a cylinder;
a crankshaft that includes a crank-side air inlet and a gas outflow port, the gas being caused to flow out through the crank-side air inlet from a crank-side hollow portion provided in the crankshaft, the gas in the crank-side hollow portion being fed in the pin-side hollow portion through the gas outflow port; and
a connecting rod that has a first end portion and a second end portion, the first end portion being joined to an eccentric portion of the crankshaft, the second end portion being joined to the piston pin, the connecting rod feeding the gas in the crank-side hollow portion to the pin-side hollow portion through a gas passage formed in the connecting rod,
wherein grooves are formed in inner peripheral surfaces of the first end portion and the second end portion or outer peripheral surfaces of the piston pin and the eccentric portion, and
the gas outflow port of the crankshaft and the gas inflow port of the piston pin are communicated with the grooves while the piston is reciprocated one time.

5. The piston apparatus according to claim 4, wherein the groove is formed while avoiding a portion which includes the most-eccentric portion of the eccentric portion, the portion facing a rotational axis side of the crankshaft with respect to the most-eccentric portion of the eccentric portion.

6. A piston apparatus comprising:
a piston pin that includes a pin-side air inlet and a gas inflow port, gas being caused to flow out through the pin-side air inlet from a pin-side hollow portion provided in the piston pin, the gas being taken in the pin-side hollow portion through the gas inflow port, the piston pin being attached to a piston which performs reciprocating motion in a cylinder;
a crankshaft that includes a crank-side air inlet and a gas outflow port, the gas being caused to flow out through the crank-side air inlet from a crank-side hollow portion provided in the crankshaft, the gas in the crank-side hollow portion being fed in the pin-side hollow portion through the gas outflow port; and
a connecting rod that has a first end portion and a second end portion, the first end portion being joined to an eccentric portion of the crankshaft, the second end portion being joined to the piston pin, the connecting rod feeding the gas in the crank-side hollow portion to the pin-side hollow portion through a gas passage formed in the connecting rod, wherein a cross-sectional shape perpendicular to a rotational axis of the crankshaft in a rotating shaft portion of the crankshaft is included in a cross-sectional shape perpendicular to the rotational axis of the crankshaft in the eccentric portion.

7. A piston apparatus comprising:
a piston pin that includes a pin-side air inlet and a gas inflow port, gas being caused to flow out through the pin-side air inlet from a pin-side hollow portion provided in the piston pin, the gas being taken in the pin-side hollow portion through the gas inflow port, the piston pin being attached to a piston which performs reciprocating motion in a cylinder;
a crankshaft that includes a crank-side air inlet and a gas outflow port, the gas being caused to flow out through the crank-side air inlet from a crank-side hollow portion provided in the crankshaft, the gas in the crank-side hollow portion being fed in the pin-side hollow portion through the gas outflow port; and
a connecting rod that has a first end portion and a second end portion, the first end portion being joined to an eccentric portion of the crankshaft, the second end portion being joined to the piston pin, the connecting rod feeding the gas in the crank-side hollow portion to the pin-side hollow portion through a gas passage formed in the connecting rod,
wherein a piston-side air inlet is provided in a side peripheral portion of the piston, the gas being caused to flow out between the piston and the cylinder from a piston-side hollow portion provided in the piston, and
the pin-side hollow portion formed in the piston pin is communicated with the piston-side hollow portion.

* * * * *